Feb. 24, 1953 R. S. ARMSTRONG ET AL 2,629,361
FEEDER
Filed May 27, 1949 2 SHEETS—SHEET 2
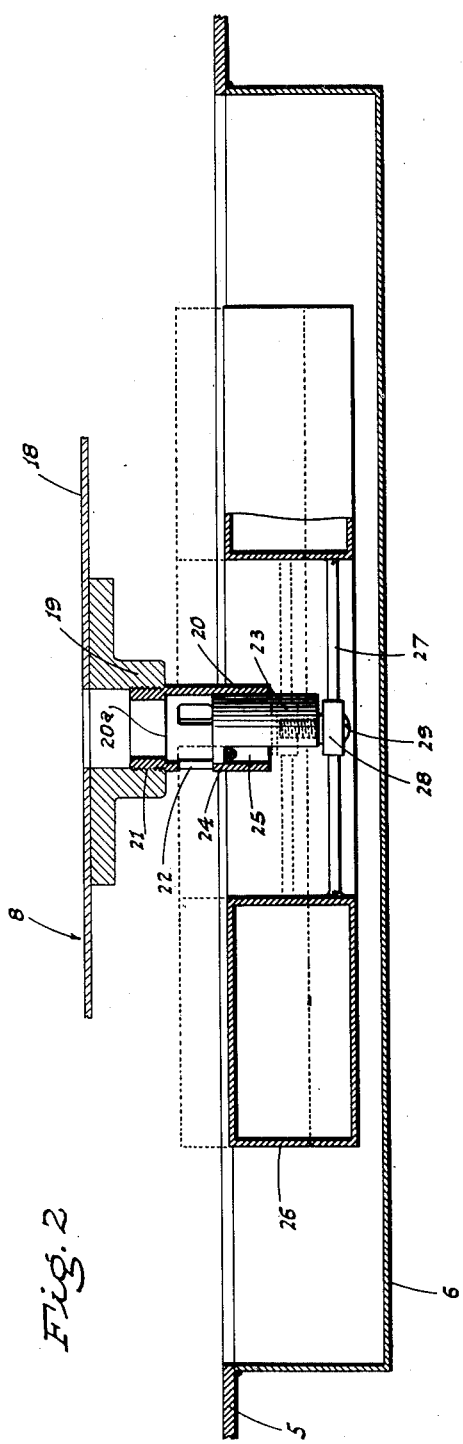
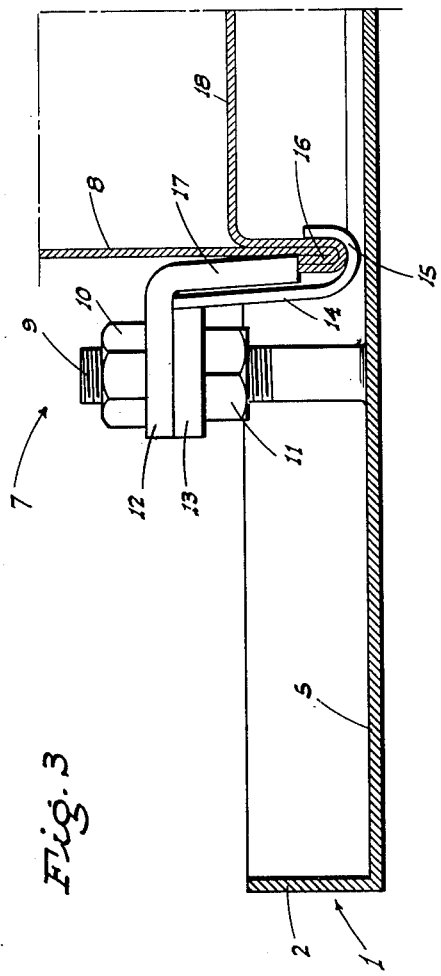
INVENTORS
R. S. Armstrong
D. Mogliotti
F. S. Mogliotti
BY
ATTORNEYS Patented Feb. 24, 1953

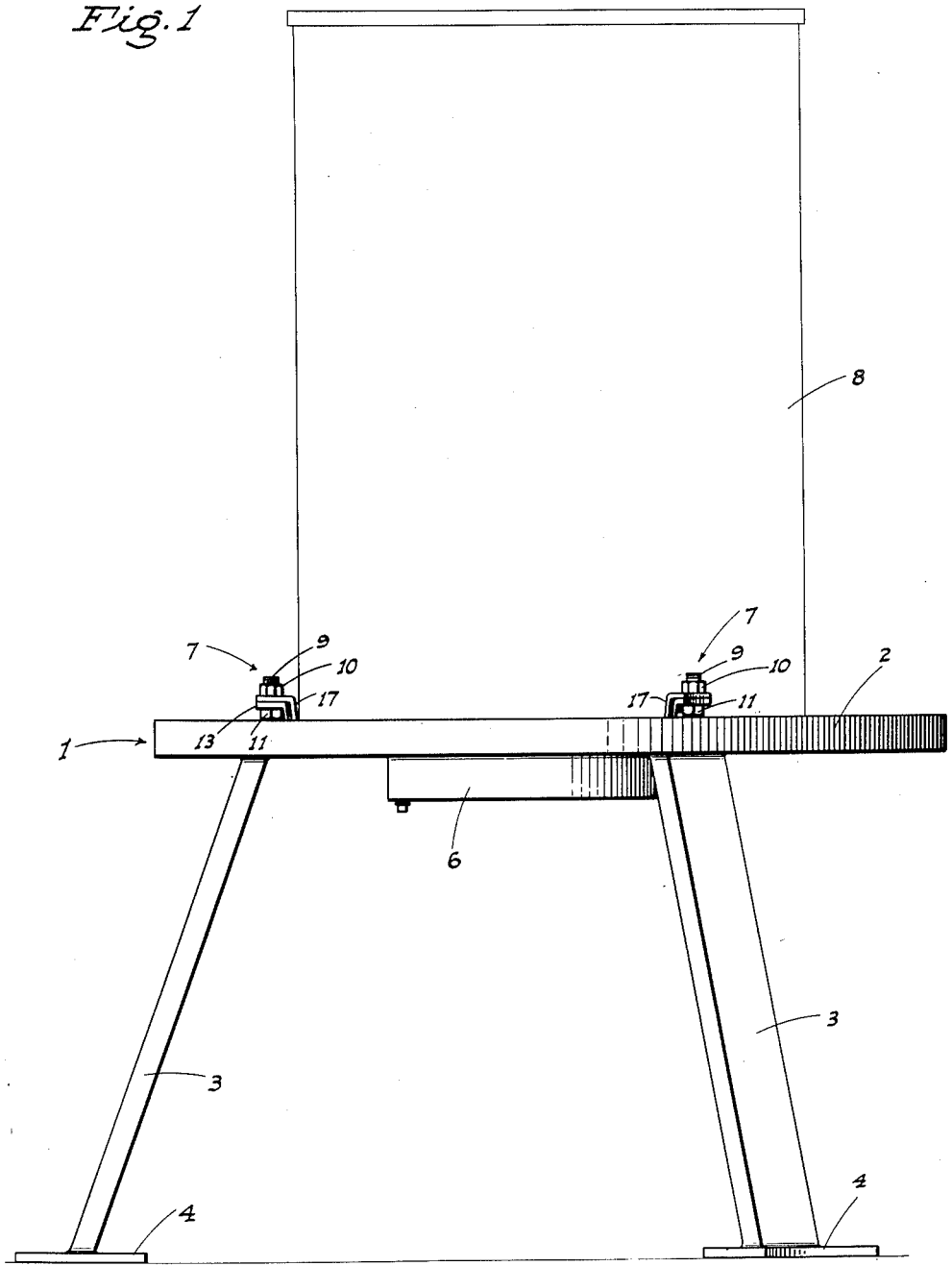

2,629,361

UNITED STATES PATENT OFFICE 2,629,361

FEEDER

Robert S. Armstrong, Merced, and Domenic Mogliotti and Frank S. Mogliotti, Atwater, Calif.

Application May 27, 1949, Serial No. 95,604

1 Claim. (Cl. 119—80)

1

This invention is directed to, and it is an object to provide, a novel device adapted to feed fluid but viscous molasses or the like from an inverted barrel into a feeder pan for access by cattle.

Another object of the invention is to provide a feeder, as above, which embodies a flow control valve unit of novel construction and operation; such valve unit including a float working in a well formed in the feeder pan.

A further object is to provide a feeder, for the purpose described, which includes an assembly of novel supporting units arranged to vertically adjustably support an inverted barrel in proper position above the feeder pan; such units also serving to prevent the barrel from being tipped off the device by cattle bumping thereagainst.

An additional object of the invention is to provide a feeder which is adapted for use with a conventional barrel, thus eliminating the need for a special container for the liquid feed.

It is also an object of the invention to provide a feeder which is designed for ease and economy of manufacture; the device being stable, rugged, and easy to maintain.

A further object of the invention is to provide a practical and reliable device, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the feeder as in use.

Fig. 2 is an enlarged fragmentary sectional elevation showing mainly the flow control valve unit.

Fig. 3 is an enlarged sectional elevation showing mainly one of the barrel supporting and clamping units.

Referring now more particularly to the characters of reference on the drawings, the feeder comprises a relatively shallow circular pan 1, which includes an upstanding peripheral flange 2; the pan 1 being supported a distance above the ground by fixed legs 3 in tripod arrangement. The legs 3 are fitted, at their lower ends, with ground engaging feet 4.

The bottom 5 of the pan 1 is formed with a central, relatively shallow circular well 6, and concentric about said well the bottom 5 is fitted with a plurality of circumferentially spaced barrel supporting and clamping units 7. The units 7 are adapted to secure a barrel 8, in inverted position, concentrically of the pan 1 adjacent but above the bottom 5 thereof; the pan 1 being of greater diameter than said barrel 8.

As each of the barrel supporting and clamping units 7 are identical, a description of one will suffice for all:

Each barrel supporting and clamping unit 7 comprises a vertical stud 9 fixed to, and upstanding from, the bottom 5 of the pan; the upper portion of said stud being threaded, as shown.

A pair of adjustment nuts, indicated at 10 and 11, are threaded on the stud 9 and clampingly engage a pair of flanges 12 and 13 therebetween; the stud 9 projecting through said flanges 12 and 13.

The flange 13, which is lowermost, is formed on the inner side with a fixed depending suspension arm 14 having a cradle 15 on its lower end; the outwardly projecting rim bead 16 of the barrel seating in said cradle.

The flange 12, which is uppermost, is formed on the inner side with a fixed depending clamp-down arm 17 which terminates short of the cradle 15 and bears directly on top of said rim bead 16 of the barrel.

It will be recognized that the cradle 15, together with the clamp-down arm 17, may be vertically adjusted on the stud 9, whereby to properly position the adjacent end 18 of the inverted barrel 8 a predetermined distance above the bottom 5 of the pan.

In addition to supporting the inverted barrel 8, the units 7—by inclusion of the clamp-down arms 17—also secure the barrel against lateral tilting off the pan 1, as might otherwise occur upon an animal bumping said barrel.

A liquid food, such as fluid but viscous molasses, is fed from the inverted barrel 8 into the pan 1 in controlled quantity by means of the following mechanism:

The inverted barrel 8 includes a fitting 19 on said adjacent end 18, and a tubular valve body 20 is removably threaded, as at 21, into the fitting 19; such valve body depending from said fitting part way into the well 6 centrally thereof.

The tubular valve body 20 is formed, slightly above the horizontal plane of the bottom 5 of the pan, with a plurality of ports 22; such ports being adapted to be opened or closed by a vertically movable valve plunger 23 which works in said tubular valve body 20 from below.

A cross pin 24 in the tubular valve body 20 extends through a tangential slot 25 in the plunger 23 to a point below the ports 22, but short of the lower end of said body.

In other words, the valve plunger 23 can work up or down across the ports 22, but cannot escape said valve body 20.

The valve body 20, above the ports 22, is formed with an internal endless downwardly facing shoulder 20a, as shown in Fig. 2. This shoulder not only limits the upward movement of the valve plunger 23, but provides a seal between the body and plunger to aid in preventing leakage through the ports when the valve is closed.

An annular float 26 is disposed in surrounding relation to the tubular valve body 20, and for vertical working motion in the well 6. The annular float 26 is formed, in the central opening thereof, with a fixed spider 27 which includes a center block 28 attached by a screw 29 to the lower end of the valve plunger 23.

When the above described feeder is in use, with a barrel of liquid feed supported in inverted position above the pan 1 by the units 7, the float 26 works in the well 6 to control the flow of liquid from said inverted barrel 8 into the pan. When the liquid in the pan 1, including the well 6, reaches a predetermined level above the bottom 5, the float rises to an extent to cause the valve plunger 23 to close the ports 22.

The animals feed in the pan 1 about the barrel 8, and as the liquid food is reduced in depth in the pan 1, the float 26 correspondingly lowers to open the ports 22. In this manner a relatively constant depth of liquid is maintained in the pan 1 for animal access.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In an animal feeder which comprises a feeding pan adapted to be supported from the ground and means on the pan to support a barrel of liquid feed above the pan, the barrel having an outlet fitting on its lower end; means to control the flow from the barrel onto the pan comprising a tubular valve body secured in and depending from the fitting, said body having ports in the side thereof, a valve plunger movable vertically in the body and having a top portion slidably fitted in the body and movable from above to below the ports, a float connected to the plunger below the body, a shoulder in the body limiting upward movement of the plunger and forming a seal against the same, and an element in the body to engage and limit downward movement of the plunger to a full-open position of the ports.

ROBERT S. ARMSTRONG.
DOMENIC MOGLIOTTI.
FRANK S. MOGLIOTTI.

REFERENCES CITED

The following references are of record in the file of this patent:

UNITED STATES PATENTS

| Number | Name | Date |
|---|---|---|
| 583,574 | Hendrix et al. | June 1, 1897 |
| 810,111 | Garrett | Jan. 16, 1906 |
| 1,007,442 | Hahesy | Oct. 31, 1911 |
| 1,113,518 | Wagner | Oct. 13, 1914 |
| 1,231,976 | Weitzel, 2d | July 3, 1917 |
| 1,313,446 | Wright | Aug. 19, 1919 |
| 1,354,349 | Solomon | Sept. 28, 1920 |
| 1,828,104 | Divekey | Oct. 20, 1931 |
| 1,837,411 | Cutter | Dec. 22, 1931 |
| 2,097,719 | Brembeck | Nov. 2, 1937 |
| 2,278,047 | Van Fleet | Mar. 31, 1942 |
| 2,341,048 | Kopp | Feb. 8, 1944 |
| 2,352,373 | Eash | June 27, 1944 |
| 2,519,322 | Peters et al. | Aug. 15, 1950 |

FOREIGN PATENTS

| Number | Country | Date |
|---|---|---|
| 58,836 | Switzerland | Oct. 26, 1911 |